US012688459B2

(12) United States Patent
Triplet et al.

(10) Patent No.: US 12,688,459 B2
(45) Date of Patent: Jul. 21, 2026

(54) PREDICTING THE INTENT OF A NETWORK OPERATOR FOR MAKING CONFIG CHANGES

(71) Applicant: Ciena Corporation, Hanover, MD (US)

(72) Inventors: Thomas Triplet, Manotick (CA); Sudhan Puranik, Pune (IN); David Côté, Gatineau (CA)

(73) Assignee: Ciena Corporation, Hanover, MD (US)

( * ) Notice: Subject to any disclaimer, the term of this patent is extended or adjusted under 35 U.S.C. 154(b) by 814 days.

(21) Appl. No.: 17/968,867

(22) Filed: Oct. 19, 2022

(65) Prior Publication Data

US 2024/0078467 A1     Mar. 7, 2024

(30) Foreign Application Priority Data

Sep. 5, 2022     (IN) .............................. 202211050612

(51) Int. Cl.
*G06N 20/00* (2019.01)
*H04L 41/0816* (2022.01)

(52) U.S. Cl.
CPC ......... *G06N 20/00* (2019.01); *H04L 41/0816* (2013.01)

(58) Field of Classification Search
CPC .......... H04L 41/0816; G06N 3/02–105; G06F 8/30–38
See application file for complete search history.

(56) References Cited

U.S. PATENT DOCUMENTS 7,890,654 B1    2/2011  Tadimeti et al.
8,335,850 B2   12/2012  Benedetto et al.

8,625,460 B2    1/2014  Dutt et al.
10,033,623 B2    7/2018  Jain et al.
11,115,272 B1 *  9/2021  Kumar .................... H04L 41/22
2005/0025075 A1    2/2005  Putt et al.
2020/0259700 A1 *  8/2020  Bhalla ................... G06F 3/0482
2021/0218635 A1    7/2021  Cherrington et al.
2022/0350966 A1 * 11/2022  Thomas ................ G06F 40/253
2023/0006881 A1 *  1/2023  Krishnamurthy ... H04L 41/0816
2023/0370887 A1 * 11/2023  Parker ............... H04W 28/0242
2024/0106853 A1 *  3/2024  McDonald .......... H04L 63/1433
2024/0155435 A1 *  5/2024  Karapantelakis ..... H04W 28/24

OTHER PUBLICATIONS

Lindquist, David, et al. "IBM service management architecture." IBM Systems Journal 46.3 (2007): 423-440. (Year: 2007).*
Ghadhab, Lobna, et al. "Augmenting commit classification by using fine-grained source code changes and a pre-trained deep neural language model." Information and Software Technology 135 (2021): 106566. (Year: 2021).*
Meng, Na, Zijian Jiang, and Hao Zhong. "Classifying code commits with convolutional neural networks." 2021 International Joint Conference on Neural Networks (IJCNN). IEEE, 2021. (Year: 2021).*

* cited by examiner

*Primary Examiner* — Liang Y Li
(74) *Attorney, Agent, or Firm* — Baratta Law PLLC; Lawrence A. Baratta, Jr.

(57) ABSTRACT

Systems and methods described herein are adapted to predict the intent of a network operator when it is determined that configuration changes (or config changes) are made to a network device. A method, according to one implementation, includes the step of collecting raw data related to a Network Element (NE). The method also includes the step of pre-processing the raw data to obtain a config change associated with the NE. Also, the method includes the step of applying the config change as input to a ML model to predict a user intent representing a desired network outcome.

18 Claims, 4 Drawing Sheets

COLLECT RAW DATA RELATED
TO A NETWORK ELEMENT (NE)          82

PRE-PROCESS THE RAW DATA TO OBTAIN A CONFIG
CHANGE ASSOCIATED WITH THE NE          84

APPLY THE CONFIG CHANGE AS INPUT TO A MACHINE
LEARNING (ML) MODEL TO PREDICT A USER INTENT
REPRESENTING A DESIRED NETWORK OUTCOME          86

PREDICTING THE INTENT OF A NETWORK OPERATOR FOR MAKING CONFIG CHANGES

TECHNICAL FIELD

The present disclosure generally relates to networking systems and methods. More particularly, the present disclosure relates to predicting the intent of a network operator for entering changes to config files in network elements.

BACKGROUND

Currently, there are available tools (e.g., SolarWinds, GluWare, etc.) for use in a network environment for showing configuration ("config") differences and logs based on raw config versions. However, the conventional tools merely present these config changes and do not further analyze the config changes. Other tools are available for explaining defective config files, which use performance metrics of the devices in a network.

It should be noted, however, that the outputs from these various tools are merely a starting point for network operators (e.g., network administrators, users, Network Operations Center (NOC) engineers, etc.). As such, the network operators typically must go through all the raw configuration files to find out the differences and then enter commands (e.g., using a Command Line Interface (CLI) in many cases) in order to configure these network devices. The network operators may generate workflow paths for enabling different services on the network. However, if any new device config change is observed, which would typically result in a change to these workflow paths, then the network operator is required to perform manual interventions to enact the changes.

In addition, the process of "network discovery" can be a critical step to allow a network operator to have a real-time view of their network and its topology. Discovering the network topology may be important for various network planning strategies, such as for intent-based provisioning and assurance purposes. Discovering the network elements requires the development of Resources Adapters (RAs), which can parse and map the device information to a model (e.g., ontology process) that represents a common set of entities, attributes, and their relationships. However, the development of these RAs and the necessary associated modelling can be a tedious and time-consuming effort by knowledgeable network engineers.

In addition, although raw configurations, low-level CLI commands, and configuration changes may typically be retrieved from the logs of network devices in a trivial manner, understanding the "user intent" behind config changes is a process that is not addressed in conventional systems. Even if such a process were attempted, one of ordinary skill in the art would understand that attempting to determine user intent would be a challenging undertaking. Nevertheless, there is a need in the field of network management to assist network operators in various ways (e.g., for network planning, for auditing config drifts, for root-cause analysis of network issues, etc.).

Although the process of identifying "intent" is not addressed in the conventional systems, it may be noted that such an endeavor might include manual efforts by the network operators to identify intent behind config changes. Thus, an expert would be needed to find out what config template or low-level CLI commands were used against particular configuration change. Of course, this may be difficult for even the most skilled network experts. It would be difficult to discover root-cause issues using existing system if these issues were caused by config change, especially since the network operator would need to go through hundreds of config files to find the problematic config change. Existing systems cannot predict the config commands that had been executed by just viewing past config change files. Therefore, there is a need in the field of network management to predict the intent behind those config changes.

BRIEF SUMMARY

The present disclosure relates systems and methods for predicting user intent with regard to config changes in a network device. According to one implementation as defined in the present disclosure, a process for predicting intent includes the step of collecting raw data related to a Network Element (NE). Next, the process includes pre-processing the raw data to obtain a config change associated with the NE. Then, the process includes the step of applying the config change as input to a ML model to predict a user intent representing a desired network outcome.

According to some implementations, the user intent may be defined as being related to one or more of a provisioning of a new network service, an addition or removal of a network function, a rebooting of the NE, and an upgrade to software and/or firmware on the NE. In response to predicting the user intent, the process may further include any of the steps of a) providing options to a network operator, b) providing recommendations to a network operator, c) providing notifications to a network operator, d) automatically triggering workflow changes in a network according to a closed-loop automation process, and/or other responsive actions.

The NE described here may be adapted to operate on a multi-domain, multi-vendor enterprise network. In some embodiments, the process may be implemented on an orchestrator of a Network Operations Center, which may be in communication with the enterprise network. The process may further include the step of training the ML model 66 using supervised training procedures based on historical data and labels. The historical config change information may be used as input data to train the ML model. Also, in some embodiments, the process 80 may further include the step of re-training the ML model in a self-evolving manner based on the historical data and new data.

Also, in some embodiments, the step of collecting the raw data may include the step of collecting data from device logs, configuration management systems, configuration back-up servers, ticketing systems, third party configuration management tools, and Information Technology Service Management (ITSM) systems. The step of collecting the raw data may also include obtaining commands entered by a network operator using a Command Line Interface (CLI). The config change may be applied to a config file using one or more config templates on the CLI, where each of the one or more config templates may include a) a list of config commands, b) a template description, c) a name of the config template, d) a specifically identified tool, e) a difference between config versions corresponding to incremental change resulting from execution of commands in the config template, and/or other information. It may be noted that the ML model may be able to predict user intent in real-time.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
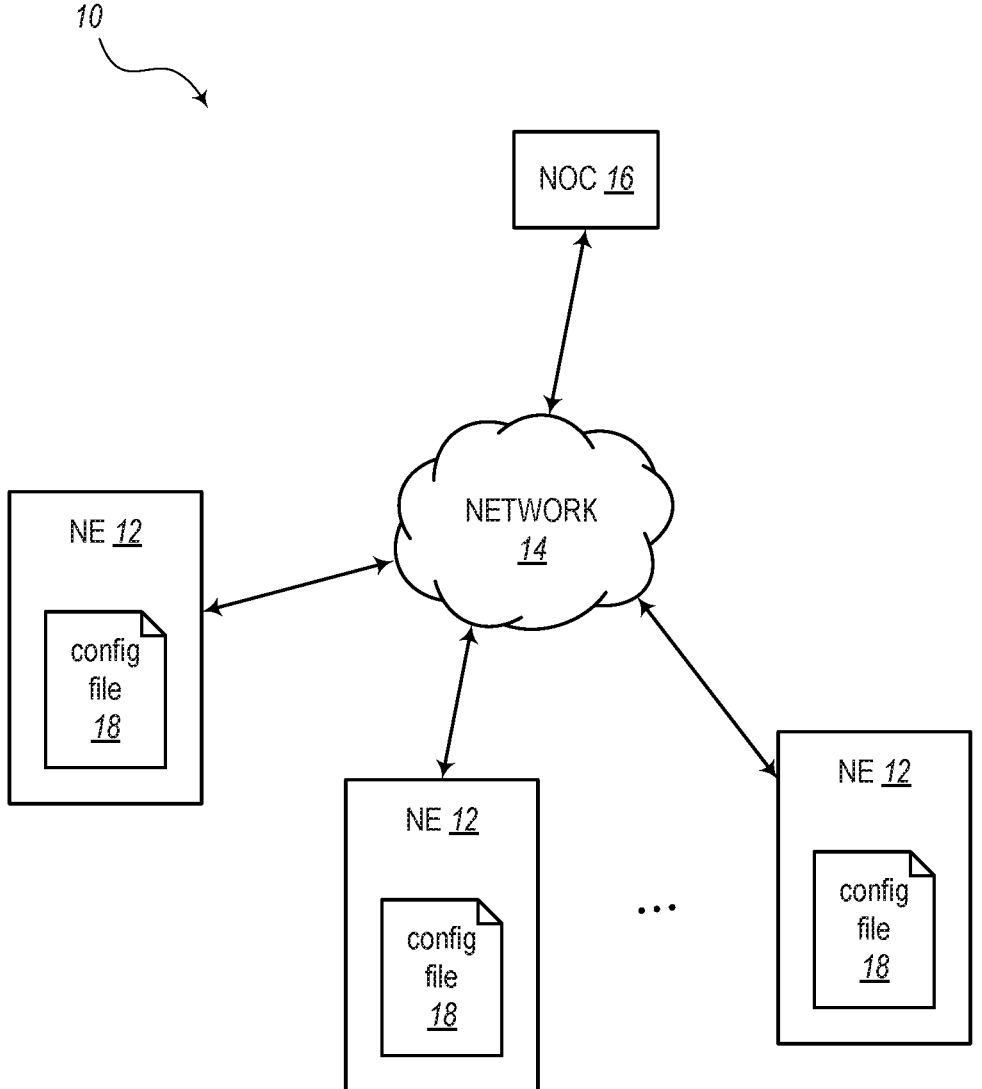
FIG. 1 is a block diagram illustrating a communications system in which a number of Network Elements (NEs) are adapted to communicate with one another in order to enable network services, according to various embodiments.

The present disclosure relates to systems and methods for obtaining network data to detect configuration ("config") changes in network devices. From the config changes (e.g., config difference, config diff, etc.), the embodiments of the present disclosure are configured to automatically predict the "user intent" behind the config changes. The intent may refer to a desire (by the network operator) to add or remove a node from the network, change network services, etc. After determining the intent, the present systems and methods may then act on this prediction by presenting options and/or recommendations to the network operator. For example, these options and/or recommendations may be useful for ensuring that the config changes will not cause the network to behave in an undesirable manner.

When network discovery is performed to determine a real-time picture of a network, it will be possible for a network operator to perform further analysis and management procedures for enable a network to function efficiently. Other network management techniques may include intent-based provisioning and assurance processing. For example, intent-base provisioning includes a process that may be understood as somewhat of a reversed process with respect to the embodiments of the present disclosure. Intent-based networking includes allowing a user to actually enter an intent and then allowing software to automatically configure the network devices as needed to meet this intent. On the other hand, the embodiments of the present disclosure described a process that is, to some extent, a reversal of this. The present systems and methods automatically detect when a network operator has attempted to change config files of network devices and then predicts the intent of the network operator.

As mentioned above, the conventional network discovery may require the development of Resources Adaptors (RA) that can parse and map the device information to a model, which may represent a common set of entities, attributes, and their relationships. The development of those RAs and the necessary modelling would normally be a tedious and time-consuming effort by knowledgeable network engineers. However, the embodiments of the present disclosure may use Machine Learning (ML) techniques to predict intent and hence do not require Ras.

The systems and methods of the present disclosure can automatically (and in real-time) leverage ML to predict with high accuracy the intent of a config change in a network, such as a multi-domain, multi-vendor network. The ML algorithms of the present disclosure may use raw config information from the devices as the only source of input data. Using a prototype in accordance with this approach, the prototype was tested on real-life data samples of actual config changes from an IT production network. It was revealed from this testing that the embodiments of the present disclosure, as represented by the prototype, was able to achieve an extremely favorable accuracy of 95%.

The present disclosure is configured to use a supervised ML strategy to automatically predict the intent from raw config changes. After working on data related to the raw config changes, the ML was able to learn the intent behind the config changes that had been manually entered by the network operator. In some embodiments, the ML may include generic ML algorithms that can work "out of the box" in a software product. Then, the AI can be used by a system (in software) that can provide recommendations and/or notifications to the network operator related to the discover intent behind the config changes. For example, the ML may operate in any suitable system within a network, such as in a Network Operations Center (NOC), Network Management System (NMS), data center, Operations, Administration, and Management (OAM) system, etc. One of the benefits is that the predicted intent provides a layer of abstraction above the raw Command Line Interface (CLI) commands that may be executed to achieve the desired state and may be easier to understand by human operators.

In some respects, the ML model used for predicting intent may be built as a self-evolving intelligent ML system. The systems and methods of the present disclosure can automatically re-train or re-learn on historical data provided by configuration management systems and evaluate the performance on their own. For example, this may be important in order to accommodate new devices and learn config change intent, particularly as a network evolves over time. In response to determining the high-level "intent," the systems and methods may be adapted to take decisive actions, such as by automatically reconfiguring devices as needed (to avoid faults), send recommendations and/or options to the network operators for further clarifications, trigger work-flows using the intent rather than the raw CLI commands. Thus, even if a user were to incorrectly enter CLI commands, the systems and methods may be able to detect what the user intended and respond accordingly, such as by automatically making necessary changes, presenting options to the network operator (e.g., with possible consequences of each), presenting recommendations to network operator (e.g., to avoid faults, breaches of service agreements, etc.), or simply to ask for further clarification if the intent is not sufficiently clear.

The systems and methods can also combine data from multiple config managements sources, such as from different networks and/or different customers. Of course, confidential information from one network (e.g., a first enterprise network) associated with one customer is meant to be kept separate from another network (e.g., a second enterprise network) associated with another customer, while only the general intent algorithms and associations may be shared. In this way, much more data can be used for accurately developing a ML model, which may thereby improve the global accuracy.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a communications system 10 including a plurality of Network Elements (NEs) 12. The NEs 12 are adapted to communicate with each other via a network 14 in order to enable network services. In some embodiments, the communications system 10 further includes a Network Operations Center (NOC) 16 adapted to control or manage operations on the network 14, including monitoring, controlling, and/or managing the NEs 12. The NEs 12 may be routers, switches, or the like. The NOC 16 may be a Network Management System (NMS), an Operations, Administration, and Management (OAM) system, a data center, or the like. For example, the NOC 16 or NMS may have visibility of the entire network 14 (or domain), which may allow the NOC 16 or NMS to obtain raw data (e.g., device configuration information) from the network 14.

Furthermore, each NE 12 includes a configuration ("config") file 18 having config data that controls how the NE 12 operates in the network 14. A network operator (e.g., network administrator, admin, network manager, etc.) may be configured to change or update the config files 18 in the NEs 12 in different circumstances. For example, when one or more new NEs 12 are added to the communications system 10, the config file 18 of the other NEs 12 may need to be changed, as needed, to enable network services to continue or in order to add additional services.

Figure 2:
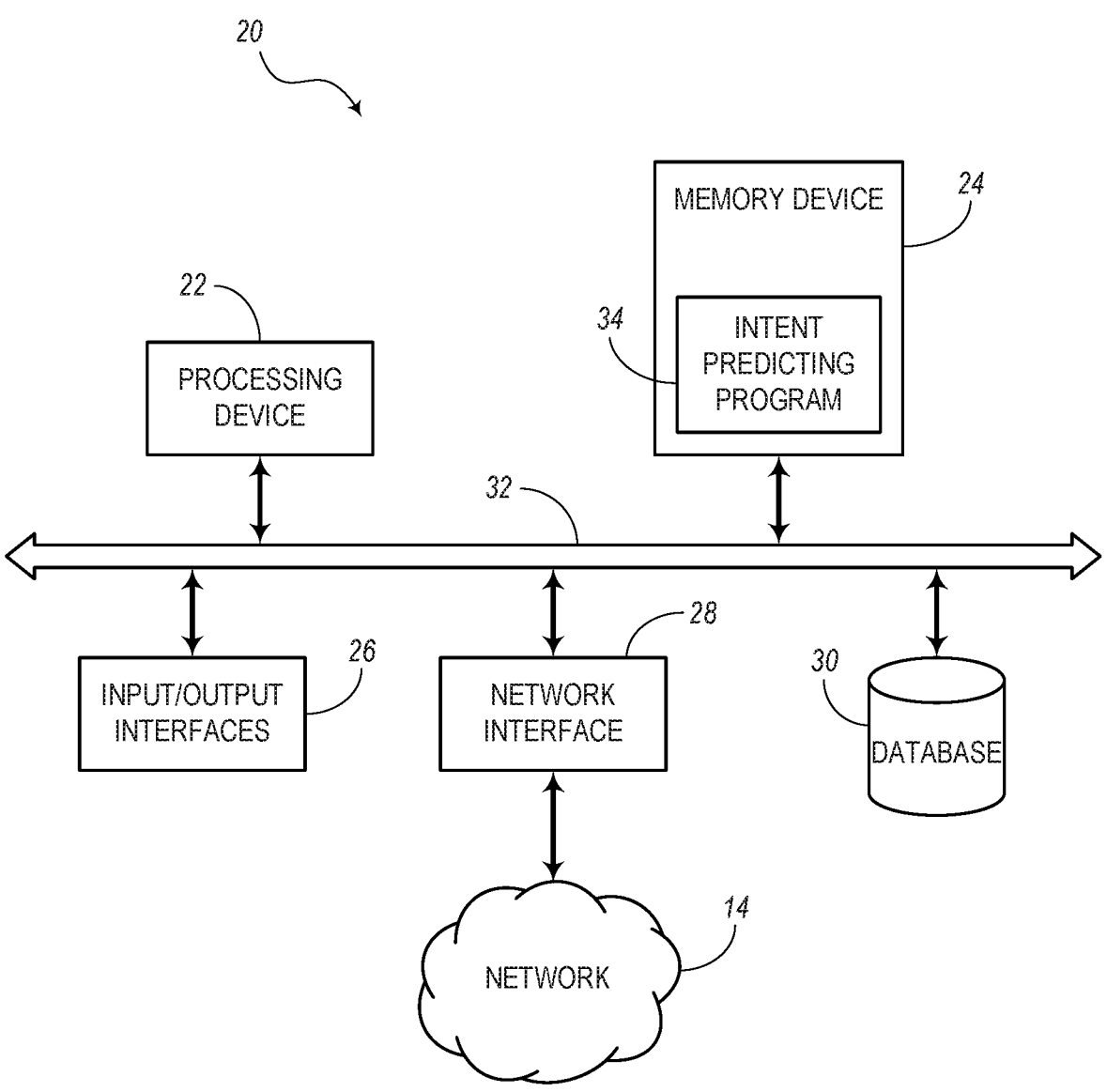
FIG. 2 is a block diagram illustrating a computer device for use in the network of FIG. 1 in order to predict the intent of a network operator for making changes to config data in the NEs, according to various embodiments.

FIG. 2 is a block diagram illustrating an embodiment of a computer device 20 for use in a network (e.g., network 14) in order to predict the "intent" of a network operator for making changes to config data in the config files 18 of the NEs 12. In some embodiments, the computer device 20 may be the NOC 16 shown in FIG. 1, a NMS, controller, orchestrator, etc. In other embodiments, the computer device 20 may represent one or more of the NEs 12 shown in FIG. 1, a node in a network, an end-user device, etc.

In the illustrated embodiment, the computer device 20 may be a digital computing device that generally includes a processing device 22, a memory device 24, Input/Output (I/O) interfaces 26, a network interface 28, and a database 30. It should be appreciated that FIG. 2 depicts the computer device 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the computer device 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the computer device 20 and may include, for example, an internal hard drive connected to the local interface 32 in the computer device 20. Additionally, in another embodiment, the data store may be located external to the computer device 20 and may include, for example, an external hard drive connected to the Input/Output (I/O) interfaces 26 (e.g., SCSI or USB connection). In a further embodiment, the data store may be connected to the computer device 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the computer device 20 to communicate over a network, such as the network 14, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 14.

As shown in FIG. 2, the computer device 20 may include an intent predicting program 34. The intent predicting program 34 may include any suitable combination of software or firmware implemented in the memory device 24 and/or hardware implemented in the processing device 22. In some embodiments, the intent predicting program 34 may include computer logic, routines, algorithms, etc. having instructions for enabling or causing the processing device 22 to perform certain functions in the network 14. For example, the intent predicting program 34 is adapted to enable the processing device 22 to detect config changes from the network 14 and predict the intent behind those changes. That is, the intent predicting program 34 can predict the intent of a network operator (or multiple network operators) for making certain changes to the config files 18 in the NEs 12. By knowing the intent, for example, it may be possible to further configure the NEs 12 accordingly and if necessary.

The intent predicting program 34 may include a Machine Learning (ML) model. The ML model may be trained using a supervised ML classifier using historical data. Also, as new data is obtained, the ML model can be retrained to provide a more accurate prediction of user intent.

It should be noted that the action of predicting intent of a network operator for making config changes may be considered to be somewhat opposite to the events of an "intent-based networking" strategy. In intent-based networking, a network operator would enter an intent directly (e.g., a need to change network service specifications based on changes to the network). The intent-based networking software may then take the enter intent and automatically make config changes to the network to fulfill or enact the intent. Thus, in intent-based networking, the general intent is provided by the user as input and the software automatically fills in the detailed config changes needed to make that happen. On the other hand, the intent predicting program 34 works in the opposite direction. A network operator (e.g., in an enterprise network) may directly make changes to config data. These changes are detected by the intent predicting program 34. Then, the intent predicting program 34 is adapted to perform certain processing functions (e.g., using Machine Learning (ML), etc.) to predict user intent from the detected config changes.

Thus, the intent predicting program 34, according to various embodiments of the present disclosure, may be adapted to collect raw data related to one or more NEs 12. The intent predicting program 34 may then pre-process the raw data to obtain a config change associated with the NE 12. Then, the intent predicting program 34 may utilize a ML model to predict a user intent based on the config change. For example, the user intent may be a desired network outcome that can be deducted from the enacted config changes in the network 14. The user intent may include a desire or intent to a) provision a new network service, b) add or remove a network function, c) upgrade software and/or firmware on one or more NEs 12, d) reboot a NE 12, among others. Additionally, in response to detecting user intent, the intent predicting program 34 may be further adapted to provide recommendations to the user (e.g., network operator, admin, etc.), send notifications to the user or admin, automatically trigger workflow changes in the network 14 in a closed-loop automation process, and other actions.

Generally, the network 14 may be a multi-domain network or enterprise network and may include various NEs 12 from multiple vendors. Although conventional networks may need a resource adapter some cases, the embodiments of the present disclosure may be adapted to work without the need for a resource adapter. The intent predicting program

34 may be configured to operate in any suitable controller, orchestrator, monitoring system in a NOC, NMS, data center, etc. The user intent may be predicted with respect to multiple NEs 14 in an enterprise network.

Regarding the process of training a ML model associated with the intent predicting program 34, the computer device 20 may use supervised ML training based on historical data and labels. The historical config change information can be used as input data to train the ML model. Also, the ML model may be self-evolving, whereby it can be re-trained and/or re-learned using the historical data as well as newly acquired data from the NEs 12 and network 14. For example, based on an event where new NEs 12 are added to the network 14, new config changes may be observed. In some embodiments, the ML model may be converted to Open Neural Network Exchange (ONNX).

Regarding the aspect of collecting raw data, the computer device 20 may be adapted to collect data from device logs, config management systems, config backup servers, ticketing systems, third party vendor config management tools (e.g., Information Technology Service Management (ITSM) tools, etc.), ticketing system, etc. The raw data may include one or more of Command Line Interface (CLI) commands where config changes are made directly to the config files 18 using a CLI by the network operator. Also, raw data may be manually entered in device logs, may include user inputs and comments, etc.

The raw data may include structured and/or unstructured data, JSON dumps from an Application Programming Interface (API), the config files 18, a baseline (or original) config file, subsequent config file versions, a list of config changes over time, config file dates, device (NE, node) names, device (NE, node) vendors, device (NE, node) model numbers, device (NE, node) location (site, city, state, country, etc.) information, config change dates and times, config commands used with respect to the config files 18, etc. Furthermore, the raw data may include changes done on the NE 12, config "templates" (e.g., listings of config commands), descriptions of templates, names of config templates, specifically identified tools, payload files, config files 18, differences between config versions corresponding to incremental change resulting from execution of commands in the config template, etc.

After the raw data is obtained, the computer device 20 is adapted to perform various pre-processing steps. For example, the computer device 20 (e.g., using the intent predicting program 34) may be adapted to extract config change information. This may include detecting a difference (e.g., config diff) from one version of a specific config file 18 to the next.

Again, the intent predicting program 34 may be adapted to use a ML model. The intent predicting program 34 may predict which config template or config commands were used to make the changes in config files 18. These predictions of user intent can be made in real-time. The process may include performing time-based clustering to detect when multiple config changes happen to different NEs 12 at about the same time, which may be the result of a service template that affects multiple NEs 12. In some embodiments, the intent predicting program 34 may further be adapted to determine that the intent of the network operator may have been to correct an issue in the network and may therefore be used to determine a root cause of the network issue. In some embodiments, the intent predicting program 34 may further be adapted to build an audit report where there is no template information.

Figure 3:
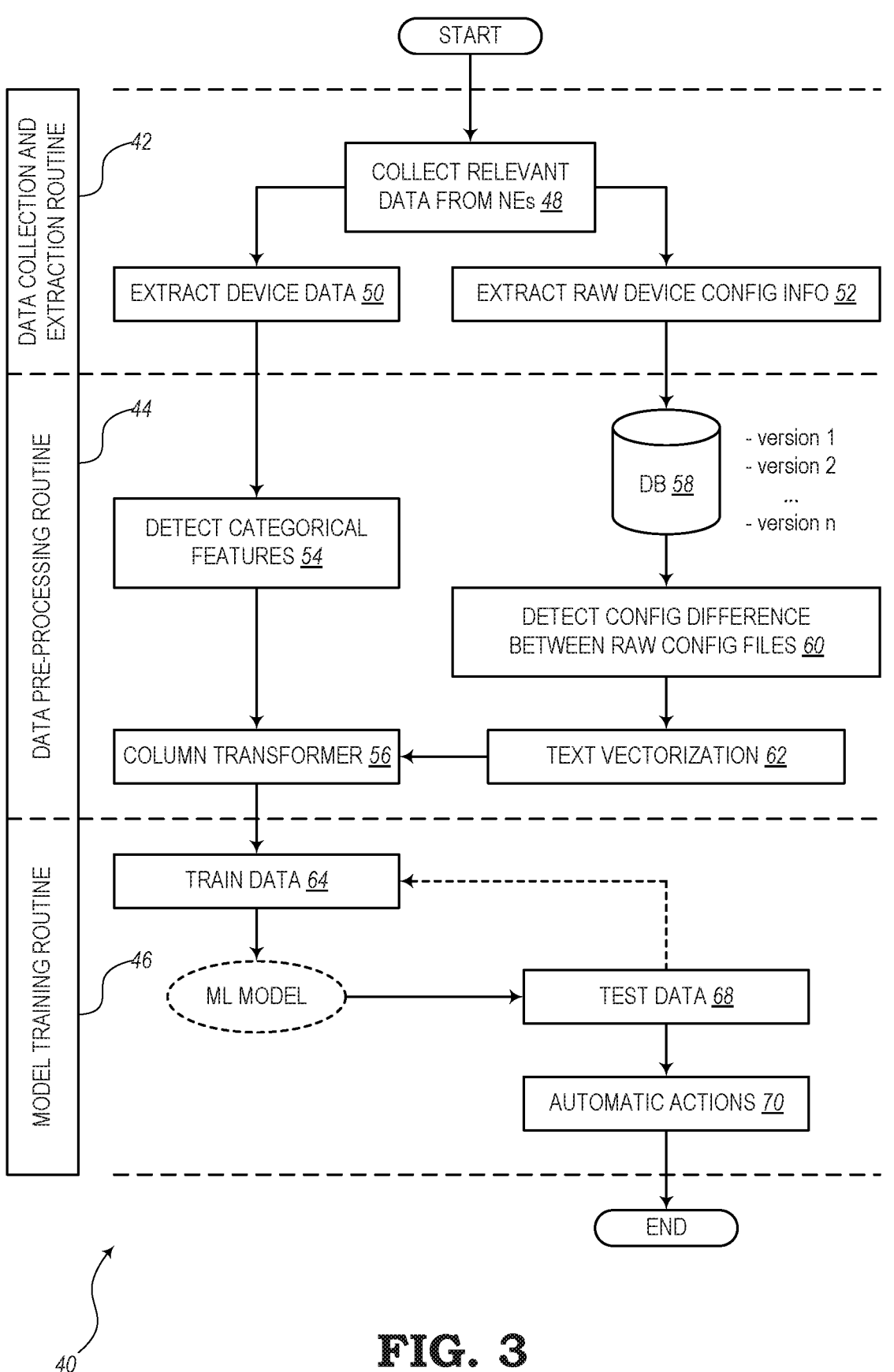
FIG. 3 is a flow diagram illustrating a Machine Learning (ML) pipeline for predicting the intent of a network operator for making changes to config data in NEs, according to various embodiments.

FIG. 3 is a flow diagram illustrating an embodiment of a ML pipeline 40 for predicting the intent of a network operator after he or she has made changes to config data in the NEs 12. The ML pipeline 40 generally includes a data collection and extraction routine 42, a data pre-processing routine 44, and a model training routine 46, where each routine 42, 44, 46 includes multiple steps. The ML pipeline 40 may be part of or include the intent predicting program 34 and/or may be performed by the NOC 16, NMS, computer device 20, processing device 22, network controller system, or the like.

The ML pipeline 40 includes the step of collecting relevant data from network devices or the NEs 12, as indicated in block 48. The data may be collected from an external system or tool that manages config files, such as a ticketing system. After collecting the relevant data, the ML pipeline 40 may branch off into two paths. One path includes the step of extracting data needed for categorizing or classifying the network device or NE 12 being tested, as indicated in block 50. The extracted data in this case may include raw config data (e.g., time-series data obtained at subsequent times) from one or more NEs 12, device names, config versions, device models, ticketing data, etc. Another branched path from the data collection step of block 48 may include the step of extracting raw device config information (e.g., config files) from the network device or NE under test, as indicated in block 52. The extracted data from blocks 50, 52 is then passed to the data pre-processing routine 44.

As indicated in block 54, categorical features of the relevant data (from block 50) are detected and passed along to block 56. In order to convert key-value pair data into ML features, block 54 may include using a suitable type of encoder (e.g., One Hot Encoder).

In the parallel path, the raw device config data from block 52 is stored in a database 58, which is configured to record an original or initial config file plus any or all subsequent versions of the config file during the lifetime of the network device or NE 12. It may be noted that the config file for each NE 12 may be changed or updated due to changes in the network or network services. Thus, instead of processing whole config files 18 of the NEs 12 that may be available in a dataset, the ML pipeline 40 may be adapted to take a unified difference of two subsequent config files from the same device, which may improve the accuracy of the model. The ML pipeline 40 further includes the step of detecting the config difference between two config files (e.g., the last two recorded config files), as indicated in block 60. The config diff information is passed along to block 62, which includes the step of performing any suitable type of text vectorizer process (e.g., Term Frequency-Inverse Document Frequency (TF-IDF), etc.), which may be adapted to create features out of the text data. In some embodiments, the text vectorization step 62 may apply stemming and lemmatization processes to the config diff before computing further metrics. The processed text information from block 62 is passed to block 56.

The aggregate results from the encoder (block 54) and the vectorizer (block 62) are combined using a column transformer (block 56). Thus, the ML pipeline 40 includes the step of performing a column transformation procedure, as indicated by block 56, using the encoded categorical features from block 54 and the text vector information from block 62. The results are passed to the model training routine 46.

In addition, the ML pipeline 40 includes the step of training the data (i.e., including at least the config changes), as indicated in block 64, to create the ML model 66 that can be used for predicting user intent. For example, the vector transformed data may be fed to a supervised ML classifier (e.g., XGBoost classifier) for model training. More advanced techniques such as deep few-shot learning algorithms can be used if statistics are low.

In some embodiments, the ML pipeline 40 may further include the step of testing the ML model 66, as indicated in block 68. For example, the model may be applied to a test dataset for accuracy evaluation. In response to testing, the ML pipeline 40 may loop back to block 64 to further train the ML model 66, if necessary. Also, the results of the training step, the ML pipeline 40 may include any suitable automatic actions, as indicated in block 70. For example, the automatic actions may include presenting options, recommendations, etc. to the network operator, automatically correcting config file issues, detecting a root-cause of a network issue, etc.

According to some embodiments, the raw data extracted in block 52 and as described with respect to FIG. 2 may include changes to the config files 18 enacted directly on the NEs 12 (e.g., using CLI commands). Particularly, the config changes may be in the form of a "template" that includes a predetermined listings of specific config commands. These templates may be generic-type command sets for performing certain modifications. The raw data from block 52 may include these config templates, descriptions of these config templates, names of these config templates, etc. Also, the raw data may include the changes from the penultimate version of the config file to the latest version, which of course may be the result of running the template to create the latest version.

Once a template has been executed on a NE 12 or network device, the ML pipeline 40 may be adapted to back up the device config data (e.g., config file) on a database 30, 58 for storing one or more versions of the config file with device information. The backed-up config files may further be stored with the templates used to create the versions. The incremental change resulting from the execution of the commands in the template may be stored as a "unidiff" representation. The unidiff format of the config change, which can show the correlation between config templates and data config files, may be used as the input data to train the ML model 66.

Then, while in use, the ML model (e.g., ML model 66) may receive new config data to predict, among other things, which config template or config commands were used to make the changes in config files 18. The ML pipeline 40 may also include a time-based clustering function to detect when multiple config changes happen to different NEs 12 at about the same time, which may be the result of executing a common template that affects multiple NEs 12.

Regarding the model training (block 64) and evaluation (block 68) steps, the ML pipeline 40 may include labeling the data (e.g., payload data) and training a supervised ML algorithm. The supervised ML algorithm can be used to predict which configuration template (configuration commands) are used to make those changes in the device configuration.

In some embodiments, the model training step (bock 64) may occur on a customer's premises or on a different location (e.g., cloud) as per customer's requirements. The ML models 66 can be re-trained by running the ML pipeline 40 on a regular basis, where each time, new data can be added for training purposes. The ML model 66 can also be re-trained in response to the detection of specific events, such as the addition of a new network device, config changes, etc.

Therefore, the systems and methods of the present disclosure provide certain features and characteristics that are believed to be novel with respect to conventional systems. For example, the multi-step end-to-end solution to detect and automatically predict the intent of config changes in a multi-layer, multi-vendor network is not addressed in conventional systems. Also, predicting an "intent" is also believed to be novel, particularly with respect to an intent being any specific network change or network service change. For example, the intent may include provisioning a new service with a template, installing or removing a new virtual network functions, upgrading any software or firmware on a node, rebooting a NE 12, etc. Also, using an ML model to predict config change intent is believed to be novel.

Also, the ML model can be trained using historical data and features such as a) configuration (config) files and b) node (or NE) information. For example, config files may include 1) commands, 2) raw configurations or incremental configuration changes, 3) versions of config files stored on system, 4) date and time of backed up config files, 5) baseline versions, and other information. The node information, for example, may include 1) node name, 2) vendor, 3) model number, 4) location of the node (e.g., site, city, country, etc.), 4) user input and comments from third party systems (e.g., ITSM, ticketing system, etc.), 5) information that can be used for labelling and training, and other information, but not necessarily required as input data to the ML model.

The embodiments of the present disclosure may further include methods (e.g., ML pipeline 40) that combine the detection of configuration drifts (e.g., config change, config diff, etc.) and the ML model to predict config change intent in real-time. In some embodiments, the changes may be initiated from outside the network 14 (e.g., enterprise network) or outside the communications system 10 and may be entered directly on the device (e.g., NE 12) itself using CLI or other similar commands or using a NOC 16 or another NMS.

The systems and methods of the present disclosure may be configured to combine the config diff with the use of time-based clustering to detect when several config changes happen approximately at the same time on different nodes as a result of service template affecting multiple nodes. For example, this may include provisioning an Internet Protocol-Multiprotocol Label Switching (IP/MPLS) tunnel, an Ethernet Virtual Local Area Network (VLAN), a Dense Wavelength Division Multiplexing (DWDM) optical channel, etc. Also, the methods may combine config diff with the use of a policy engine to define high-level intent-based triggers to execute workflows for close-loop automation.

Figure 4:
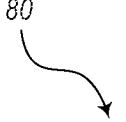
FIG. 4 is a flow diagram illustrating a process for predicting intent, according to various embodiments.
Figure 4:
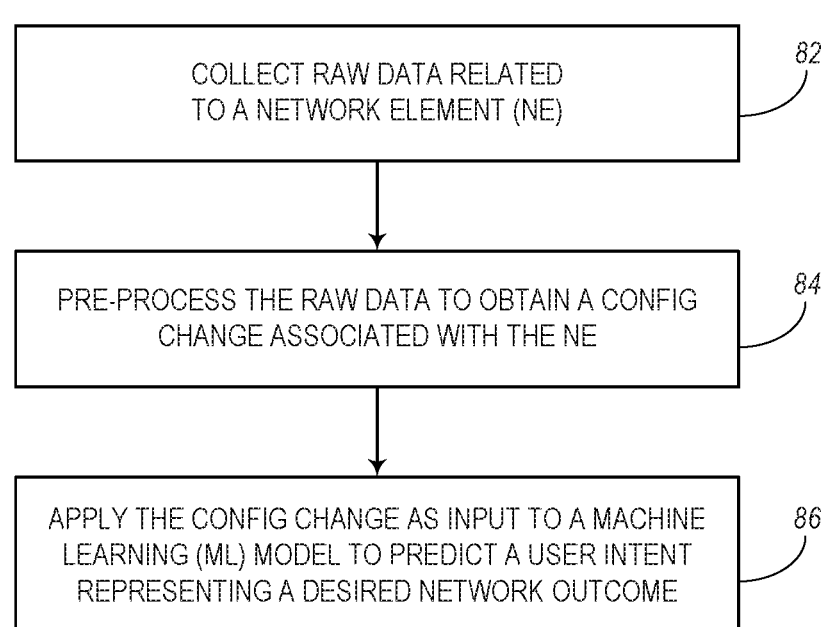

FIG. 4 is a flow diagram illustrating an embodiment of a process 80 for predicting intent. As illustrated, the process 80 includes the step of collecting raw data related to a Network Element (NE), as indicated in block 82. Next, the process 80 includes pre-processing the raw data to obtain a config change associated with the NE, as indicated in block 84. Then, the process 80 includes the step of applying the config change as input to a ML model to predict a user intent representing a desired network outcome, as indicated in block 86.

According to some implementations, the user intent may be defined as being related to one or more of a provisioning of a new network service, an addition or removal of a network function, a rebooting of the NE, and an upgrade to software and/or firmware on the NE. In response to predicting the user intent, the process 80 may further include any of the steps of a) providing options to a network operator, b)

providing recommendations to a network operator, c) providing notifications to a network operator, d) automatically triggering workflow changes in a network according to a closed-loop automation process, and/or other responsive actions.

The NE described here may be the NE 12 shown in FIG. 1 and may be adapted to operate on a multi-domain, multi-vendor enterprise network (e.g., network 14). In some embodiments, the process 80 may be implemented on an orchestrator of the NOC 16, which may be in communication with the enterprise network. The process 80 may further include the step of training the ML model 66 using supervised training procedures based on historical data and labels. The historical config change information may be used as input data to train the ML model 66. Also, in some embodiments, the process 80 may further include the step of re-training the ML model 66 in a self-evolving manner based on the historical data and new data.

Also, in some embodiments, the step of collecting the raw data (block 82) may include the step of collecting data from device logs, configuration management systems, configuration back-up servers, ticketing systems, third party configuration management tools, and Information Technology Service Management (ITSM) systems. The step of collecting the raw data (block 82) may also include obtaining commands entered by a network operator using a Command Line Interface (CLI). The config change may be applied to a config file using one or more config templates on the CLI, where each of the one or more config templates may include a) a list of config commands, b) a template description, c) a name of the config template, d) a specifically identified tool, e) a difference between config versions corresponding to incremental change resulting from execution of commands in the config template, and/or other information. It may be noted that the ML model may be able to predict user intent in real-time.

Experimentation was performed to test the ML model and related intent prediction algorithms. A Proof of Concept (PoC) was developed to validate the systems and methods of the present disclosure. Accuracy was tested using actual real-world data from an IT production network. The PoC demonstrated that the embodiments disclosed herein were able to predict and/or classify the user intent with a high accuracy of 95%.

Data may be fetched from an application deployed in a customer premises.

Sources of the historical data may be obtained from customer config management systems, from config backup servers, from ticketing systems, third party configuration management tools, etc. The data can be structured and/or unstructured data, JSON dumps from an API, full configuration files, configuration templates (e.g., lists of configuration commands), a list of config changes over time, etc. The data may include configuration files, configuration dates, device name, device vendor, model, config change date and time, and other information.

The ML model 66 created in the ML pipeline 40 was evaluated with respect to multi-class classification. Algorithms used were Random Forest and XGBoost Classifier, although more advanced algorithms may also be used (e.g., deep few-shot learning techniques), which may be used to improve accuracy in case of low statistics. The model deployment process included converting the ML models to an Open Neural Network Exchange (ONNX) format, which is an open standard format for representing machine learning models. Also, ONNX is supported by a community of partners who have implemented it in many frameworks and tools.

In addition, the evaluation metrics used to test (block 68) the ML model 66 included a Classification Report, a Confusion Matrix, and an F1-score (not shown) using equipment provided by different vendors. The confusion matrix included a normalized matrix with a prototype of the ML model 66 described in the present disclosure. It was determined that the ML model 66 was able to classify every config payload with more than 90% accuracy. Regarding accuracy evaluation and the classification report based on a standard 70:30 train-test split. The results showed favorable metrics with respect to Precision, Recall and F1 scores to demonstrate the effectively of the systems and methods of the present disclosure.

It should be understood that the embodiments of the present disclosure are able to provide many benefits over existing systems, particularly in the environment of enterprise networks where network operators may be more apt to utilize CLIs to make config changes on a device. One benefit of the present embodiments, therefore, may be to improve software and/or firmware products for significantly improving audit capabilities. Also, the systems and methods may also provide practical solutions for root-cause analytics and understanding configurations drifts. In particular, the embodiments of the present disclosure may be particularly applicable to situations where configuration changes are performed using another tool or via CLI.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, enable a processing device to:

collect raw data related to a Network Element (NE);

pre-process the raw data by detecting a configuration difference between successive configuration files of the NE to obtain a config change associated with the NE, wherein the configuration difference is stored as a unified difference and converted into feature vectors using a text vectorizer process; and apply the config change as input to a Machine Learning (ML) model to predict a user intent representing a desired network outcome, wherein the ML model is adapted to process the configuration difference in real-time across a multi-domain, multi-vendor enterprise network using raw configuration information as an input data source to collect the raw data in lieu of requiring Resource Adapters wherein applying the config change includes providing the feature vectors to a supervised ML classifier, and wherein, in response to predicting the user intent, the processing device automatically triggers a workflow change in the enterprise network according to a closed loop automation process, wherein the ML model is trained using supervised training procedures based on historical data and labels, where historical config change information is used as input data to train the ML model, wherein the labels include one or more of 1) device logs and/or records identifying execution of a specific service template on a given network element at a given time, and 2) information from device logs and/or from ticketing systems or Information Technology Service Management (ITSM) systems correlated with any config change at a given time.

2. The non-transitory computer-readable medium of claim 1, wherein the user intent is related to one or more of a provisioning of a new network service, an addition or removal of a network function, a rebooting of the NE, and an upgrade to software and/or firmware on the NE.

3. The non-transitory computer-readable medium of claim 1, wherein the instructions further enable the processing device to execute one or more functions selected from the group consisting of a) providing options to a network operator, b) providing recommendations to a network operator, c) providing notifications to a network operator, and d) automatically triggering workflow changes in a network according to a closed-loop automation process.

4. The non-transitory computer-readable medium of claim 1, wherein the NE is adapted to operate on a multi-domain, multi-vendor enterprise network and the non-transitory computer-readable medium is implemented on an orchestrator of a Network Operations Center (NOC) in communication with the enterprise network.

5. The non-transitory computer-readable medium of claim 1 wherein the instructions further enable the processing device to re-train the ML model in a self-evolving manner based on the historical data and new data.

6. The non-transitory computer-readable medium of claim 1, wherein collecting the raw data includes collecting data from device logs, configuration management systems, configuration back-up servers, ticketing systems, third party configuration management tools, and Information Technology Service Management (ITSM) systems.

7. The non-transitory computer-readable medium of claim 1, wherein collecting the raw data includes obtaining commands entered by a network operator using a Command Line Interface (CLI).

8. The non-transitory computer-readable medium of claim 7, wherein the config change is applied to a config file using one or more config templates on the CLI, each of the one or more config templates including one or more of a list of config commands, a template description, a name of the config template, a specifically identified tool, and a difference between config versions corresponding to incremental change resulting from execution of commands in the config template.

9. The non-transitory computer-readable medium of claim 1, wherein the ML model is adapted to predict user intent in real-time.

10. A system comprising:
a processing device, and
a memory device configured to store a computer program having instructions that, when executed, enable the processing device to
collect raw data related to a Network Element (NE);
pre-process the raw data by detecting a configuration difference between successive configuration files of the NE to obtain a config change associated with the NE, wherein the configuration difference is stored as a unified difference and converted into feature vectors using a text vectorizer process; and apply the config change as input to a Machine Learning (ML) model to predict a user intent representing a desired network outcome, wherein the ML model is adapted to process the configuration difference in real-time across a multi-domain, multi-vendor enterprise network using raw configuration information as an input data source to collect the raw data in lieu of requiring Resource Adapters, wherein applying the config change includes providing the feature vectors to a supervised ML classifier, and wherein, in response to predicting the user intent, the processing device automatically triggers a workflow change in the enterprise network according to a closed-loop automation process,
wherein the ML model is trained using supervised training procedures based on historical data and labels, where historical config change information is used as input data to train the ML model, wherein the labels include one or more of 1) device logs and/or records identifying execution of a specific service template on a given network element at a given time, and 2) information from device logs and/or from ticketing systems or Information Technology Service Management (ITSM) systems correlated with any config change at a given time.

11. The system of claim 10, wherein the user intent is related to one or more of a provisioning of a new network service, an addition or removal of a network function, a rebooting of the NE, and an upgrade to software and/or firmware on the NE.

12. The system of claim 10, wherein the instructions further enable the processing device to execute one or more functions selected from the group consisting of a) providing options to a network operator, b) providing recommendations to a network operator, c) providing notifications to a network operator, and d) automatically triggering workflow changes in a network according to a closed-loop automation process.

13. The system of claim 10, wherein the NE is adapted to operate on a multi-domain, multi-vendor enterprise network and the non-transitory computer-readable medium is implemented on an orchestrator of a Network Operations Center (NOC) in communication with the enterprise network.

14. The system of claim 10, wherein the instructions further enable the processing device to re-train the ML model in a self-evolving manner based on the historical data and new data.

15. A method comprising the steps of:
collecting raw data related to a Network Element (NE);
pre-processing the raw data by detecting a configuration difference between successive configuration files of the NE to obtain a config change associated with the NE, wherein the configuration difference is stored as a unified difference and converted into feature vectors using a text vectorizer process; and
applying the config change as input to a Machine Learning (ML) model to predict a user intent representing a desired network outcome, wherein the ML model is adapted to process the configuration difference in real-time across a multi-domain, multi-vendor enterprise network using raw configuration information as an input data source to collect the raw data i in lieu of requiring Resource Adapters, wherein applying the config change includes providing the feature vectors to a supervised ML classifier, and wherein, in response to predicting the user intent, the processing device automatically triggers a workflow change in the enterprise network according to a closed-loop automation process, wherein the ML model is trained using supervised training procedures based on historical data and labels, where historical config change information is used as input data to train the ML model, wherein the labels include one or more of 1) device logs and/or records identifying execution of a specific service template on a given network element at a given time, and 2) information from device logs and/or from ticketing systems or Information Technology Service Management (ITSM) systems correlated with any config change at a given time.

16. The method of claim 15, wherein collecting the raw data includes collecting data from device logs, configuration management systems, configuration back-up servers, ticketing systems, third party configuration management tools, and Information Technology Service Management (ITSM) systems.

17. The method of claim 15, wherein collecting the raw data includes obtaining commands entered by a network operator using a Command Line Interface (CLI).

18. The method of claim 17, wherein the config change is applied to a config file using one or more config templates on the CLI, each of the one or more config templates including one or more of a list of config commands, a template description, a name of the config template, a specifically identified tool, and a difference between config versions corresponding to incremental change resulting from execution of commands in the config template.

\* \* \* \* \*